Jan. 7, 1941.  C. C. UTZ  2,227,521

VEHICLE STEERING APPARATUS

Filed Nov. 14, 1938  3 Sheets-Sheet 1

INVENTOR
Chester C. Utz.
BY Harris, Kiech, Foster & Harris
ATTORNEYS.

Jan. 7, 1941.　　　　C. C. UTZ　　　　2,227,521

VEHICLE STEERING APPARATUS

Filed Nov. 14, 1938　　　3 Sheets-Sheet 2

INVENTOR
Chester C. Utz.
BY
Harness, Dickey, Pierce & Harris
ATTORNEYS.

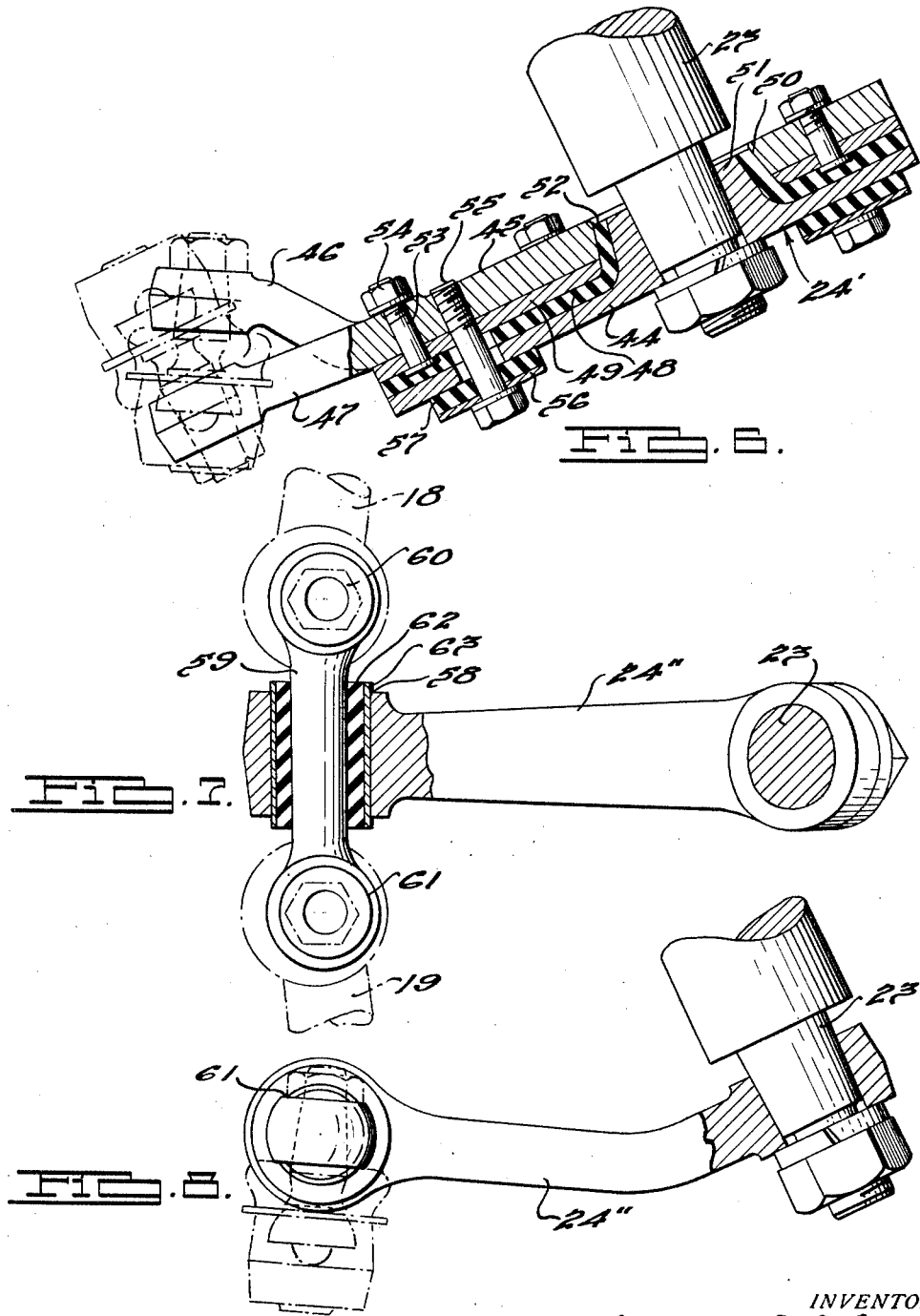

Patented Jan. 7, 1941

2,227,521

UNITED STATES PATENT OFFICE 2,227,521

VEHICLE STEERING APPARATUS

Chester C. Utz, Detroit, Mich., assignor to Chrysler Corporation, Highland Park, Mich., a corporation of Delaware Application November 14, 1938, Serial No. 240,218

13 Claims. (Cl. 280—95)

This invention relates to improvements in steering apparatus particularly adapted for motor vehicles.

An object of the invention is to provide an improved steering apparatus having means for absorbing shocks developed therein and for preventing shocks which are developed at particular locations in the apparatus from being transmitted to other locations in the apparatus which are remotely disposed from the first mentioned locations.

Another object of the invention is to provide in a steering apparatus having positively connected steering movement imparting elements and actuating means therefor, of means for preventing the transmission of shocks between the elements and the actuating means.

More particularly, an object of the invention is the provision in a steering apparatus of an improved operating connection between the steering tie rods and the actuating means, such as a pitman arm, therefor, the connection including a body of deformably non-metallic material such as rubber or its equivalent.

Steering apparatus particularly adapted for motor vehicles comprises in general a pair of rods connected with a respective steerable road wheel and operably connected for imparting uniform steering movements to the wheels. These rods are preferably positively connected in order to insure imparting of the desired steering movements to the wheels, and have an operating connection with an actuating means, such as a steering wheel conveniently located for manipulation by the vehicle operator. It is desirable to prevent the transmission of shocks, induced in the rods by action of the road wheels, to the steering wheel.

It is therefore a further object of the invention to provide in a steering apparatus improved means for overcoming the aforesaid difficulties, and to provide means of this character which may be economically manufactured and incorporated in vehicle steering apparatus, both as original equipment and as replacement in such apparatus which does not include means of the character contemplated herein.

Furthermore, in vehicles wherein the steerable road wheels are supported for independent rising and falling movements by means such as linkages, the steering tie rods or similar members for imparting steering movements to the road wheels should accommodate unrestricted movement of the wheels in the path defined by the linkages. It is therefore an object of the invention to provide in a vehicle steering apparatus improved means, such as a body of deformable material, so constructed and arranged as to accommodate unrestricted movement of the steerable road wheels in the respective paths defined therefor by the support means.

Other objects and advantages of the invention will be more apparent from the following description taken in connection with the accompanying drawings, in which:

Fig. 6 is a side elevational view, mainly in section, taken as indicated by the line 6—6 of Fig. 5.

Fig. 7 is a top plan view, partly in section, illustrating a further modification of the invention.

Fig. 8 is a side elevational view of the mechanism shown in Fig. 7.

Figure 1:
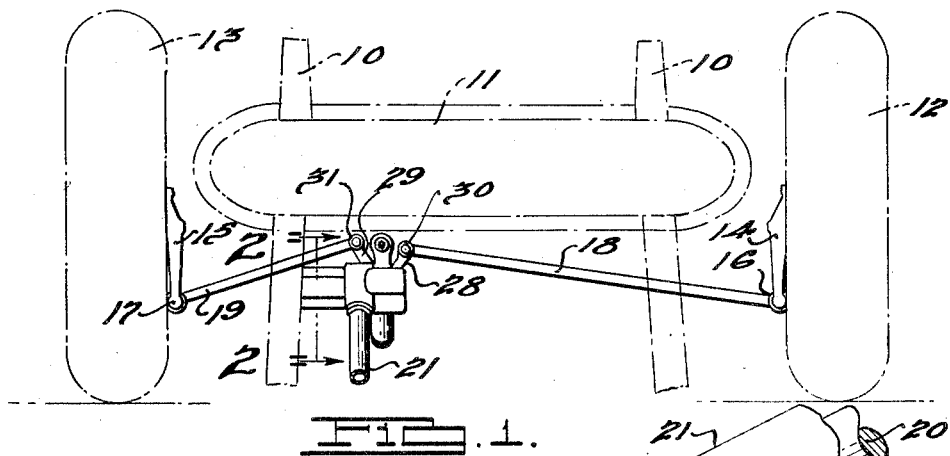
Fig. 1 is a fragmentary top plan view of the chassis of an automotive vehicle embodying a steering apparatus according to the invention.
Figure 2:
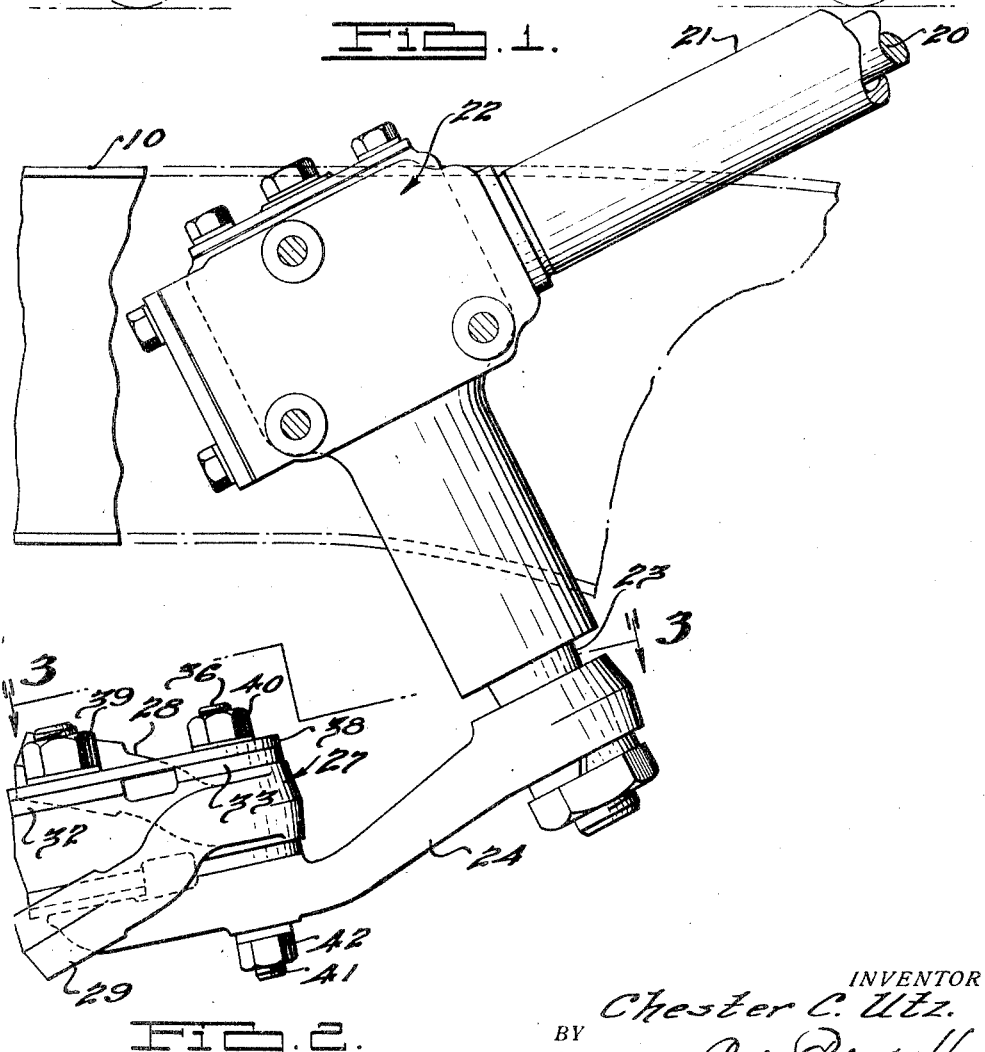
Fig. 2 is an enlarged side elevational view illustrating a portion of the steering apparatus shown in Fig. 1, the view being taken as indicated by the line 2—2 of Fig. 1.
Figure 3:
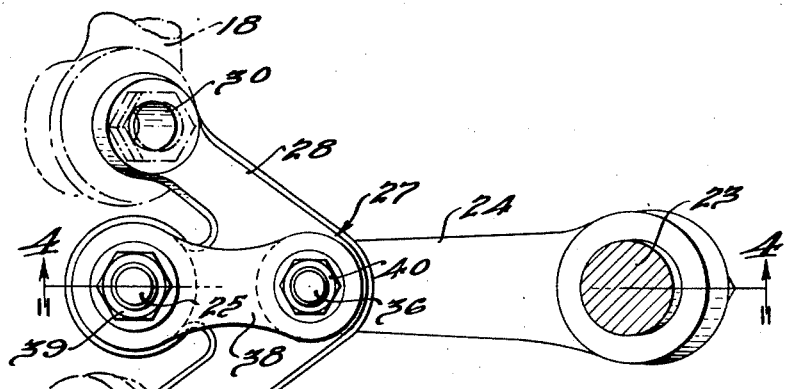
Fig. 3 is a top plan view of a portion of the steering apparatus shown in Figs. 1 and 2, the view being taken as indicated by the line 3—3 of Fig. 2.

Referring to the drawings, the invention is illustrated and described in connection with a motor vehicle chassis including longitudinally extending transversely spaced frame side rails 10 which are connected by a transversely extending structure indicated at 11. The dirigible front steerable road wheels 12 and 13 are each rotatably mounted on a suitable steering knuckle spindle (not shown) swivelled about a suitable king pin (not shown) for steering movement. The road wheels 12 and 13 may be supported for independent rising and falling movement by suitable means well known in the art and while the invention herein is particularly adapted for the foregoing type of wheel suspension, it is not to be limited in its broader aspects to the type of suspension employed.

Figure 4:
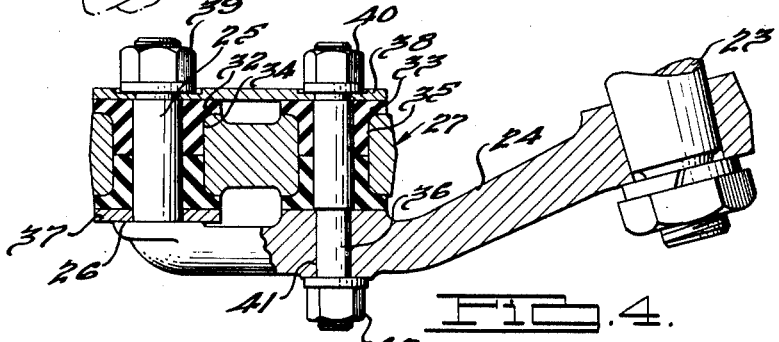
Fig. 4 is a sectional view taken as indicated by the line 4—4 of Fig. 3.

The wheels 12 and 13 have rearwardly extending steering arms 14 and 15 respectively having terminal articulated connections 16 and 17 with the tie rods 18 and 19 respectively. The usual steering wheel (not shown) operates the shaft 20 disposed in the housing 21, conveniently positioned to one side of the longitudinal vertical mid-plane of the vehicle. The shaft 20 operates the usual reduction gearing generally indicated at 22 to oscillate the shaft 23 non-rotatably secured to a pitman arm 24 for imparting steering movements to the wheels 12 and 13 through the tie rods 18 and 19. The pitman arm 24 terminates in a vertically disposed bolt-like portion 25, as indicated more particularly in Fig. 4, and the adjacent portion has a substantially flat surface as indicated at 26.

The pitman arm 24 is operably connected with the tie rods 18 and 19 by a connecting member generally indicated at 27 having laterally spaced and vertically offset arms 28 and 29, the former having an articulated connection at 30 with the relatively long tie rod 18 and the latter having a similar connection at 31 with the relatively short tie rod 19. The aforesaid connections at 30 and 31 are relatively rigid in that they are inextensible in the direction of the forces transmitted by the member 27 to the rods 18 and 19 for imparting steering movement. The advantages of the construction and arrangement of the arms 28 and 29 are more particularly set forth in U. S. Patent No. 2,129,804 of September 13, 1938.

The connection between the member 27 and the pitman arm 24 includes a body of deformable non-metallic material, preferably rubber or a material having the characteristics of the latter. As illustrated more particularly in Fig. 4 the aforesaid connection includes a pair of rubber spool-like members 32 and 33, each preferably formed in half sections to facilitate assembly although such members may be formed in a single body if desired. The connecting member 27 has an opening 34 receiving the bolt-like portion 25 of the pitman arm 24, the diameter of the latter opening being larger than the diameter of the portion 25 to accommodate disposition of the spool member 32 intermediate the wall bounding the opening 34 and the portion 25. The member 27 has a second opening 35 which receives a bolt 36, the diameter of this opening being larger than the diameter of the bolt 36 to accommodate disposition of the spool member 33 intermediate the wall bounding the opening 35 and the bolt 36.

Each of the spool members 32 and 33 is flanged at the ends thereof, the flanges overlapping the adjacent longitudinally extending surface of the connecting member 27. As viewed in Fig. 4, the lower flange of the spool member 32 abuts a washer 37 which rests upon the surface 26 of the pitman arm 24. A plate 38 rests upon the upper flanges of the members 32 and 33 and is retained thereagainst by a nut 39 threaded onto the portion 25 and a second nut 40 threaded onto the bolt 36. The latter extends through an opening 41 in the pitman arm 24 and has a retaining nut 42 threaded thereon.

In the foregoing construction embodying the invention there is provided a relatively rigid steering connection between the wheels by reason of the connection between the arms 28 and 29 and the tie rods 18 and 19. The rubber spool-like members 32 and 33 absorb shocks set up in the rods 18 and 19 by reason of the displacement of the road wheels, and prevent transmission thereof to remotely disposed portions of the steering apparatus such as the conventional manually operated steering wheel. Furthermore, the spool members being deformable, will accommodate movement of the wheels in the paths defined by the supporting and guiding means therefor without restriction by the positively connected steering tie rods.

Where the independent type of wheel suspension is employed, the path of movement of each wheel is described by the supporting means therefor. The steering apparatus including the arms 14, 15 and tie rods 18, 19 should accommodate unrestricted movement of the wheels in the aforesaid path. Where, however, irregularities of a limited nature are introduced into the steering apparatus in the manufacture and/or assembly thereof, the effects of such irregularities are minimized by the action of the rubber connections at 32 and 33 for the reason that the latter being deformable will accommodate themselves to the path of movement prescribed for the steerable wheels by the support means therefor.

Figure 5:
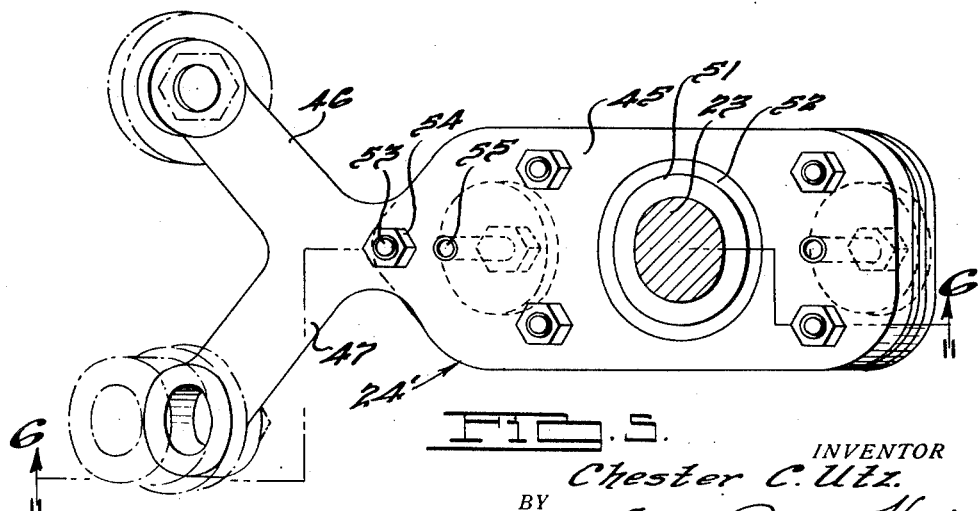
Fig. 5 is a view similar to Fig. 3 but illustrating a modified form of the invention.

Referring to the form of the invention shown in Figs. 5 and 6 the pitman arm 24' includes a plate-like member 44 non-rotatably secured to the shaft 23 for operation thereby. The member 44 is operably connected with the tie rods 18 and 19 by a plate-like connecting member 45 having laterally spaced and vertically offset arms 46 and 47 adapted for articulated connection with the rods 18 and 19 respectively in the manner set forth in connection with the previously described form of the invention. The latter connections are relatively rigid in that they are inextensible in the direction of the forces transmitted by the member 45 to the rods 18 and 19.

Interposed between the plate members 44 and 45 is a body of deformable non-metallic material 48 such as rubber or a material having the characteristics of the latter. The major portion of the body 48 is in the form of a flat strip which is disposed between the plate 44 and a metallic plate 49 and preferably bonded to the adjacent surfaces, the plate 49 being of such form as to readily accommodate the bonding operation although if desired such bonding may be dispensed with as well as provision of the plate 49. However, use of the latter facilitates manufacturing and assembly especially where bonding of the rubber is had. The connecting plate 45 has an opening 50 therein in which is inserted an annular lateral projection 51 of the plate 44. A portion of the rubber body 48 provides an annular lateral extension 52 which is disposed between the wall bounding the opening 50 and the plate 45 and the projection 51 of the plate 44.

A plurality of connectors 53 are provided in the assembly which includes the plates 44, 49 and rubber body 48, which connectors extend through openings in the plate 45 when the aforesaid assembly is united therewith. Suitable retaining nuts 54 are provided for the connectors 53. The aforesaid assembly is secured to the plate 45 by a plurality of fasteners 55, each of the latter having a head portion engaging a metallic washer 56, a deformable washer 57 comprising rubber or a material having the characteristics of the latter being disposed between the washer 56 and the adjacent face of the plate 44. Each of the fasteners 55 extends through registering openings in the rubber body 48 and plate 44, the latter openings having a diameter larger than the diameter of the fasteners 55 to accommodate relative movement between the plates 44 and 45 by reason of the rubber connection 48 provided therebetween. In this form of the invention the body of rubber 48 is subjected to a shear force in response to the steering movement and is subjected to a compressive force in response to movement of the plate 45 by the rods 18 and 19 due to non-steering movements of the wheels 12 and 13.

In the form of the invention illustrated in Figs. 7 and 8 the pitman arm 24″ has one end portion thereof non-rotatably secured to the shaft 23 and the opposite end portion thereof is provided with an opening 58 through which extends connector 59. The latter has articulated connections at 60 and 61 with the tie rods 18 and 19 respectively, these connections preferably being horizontally aligned as distinguished from the vertically offset connections indicated at 30 and 31 in the form of the invention shown in Figs. 1–4 inclusive. Disposed in the opening 58 of the arm 24″ is a bushing 62 preferably of rubber or a material having the characteristics of the latter. The outer surface of the bushing 62 is preferably bonded to a metallic shell 63 and the inner surface thereof is preferably bonded to the peripheral surface of the connector 59. In assembly, the connector 59 is inserted in the bushing 62 and the latter together with the metallic shell 63 are press-fitted in the opening 58. Vulcanization or bonding of the bushing 62 to the connector 59 prevents undesirable relative movement between the connector and bushing in response to steering movements produced by oscillation of the pitman arm 24″. Means other than the process of vulcanization or bonding, as aforesaid, may be employed if desired to prevent relative movement between the bushing and connector. In this form of the invention the material of the bushing 62 is stressed in shear in producing steering movements and is subjected to a compressive force in response to movement of the connector by the tie rods 18 and 19 due to non-steering movement of the road wheels.

Each of the improved steering arrangements illustrated and described provides the necessary form of connection for the steerable road wheels to insure transmission of the steering forces thereto by the force applying means, such as the pitman arm, and also provides, through use of the deformable body of non-metallic material, means for dampening objectionable vibrations and shocks which would otherwise be transmitted from the steerable road wheels to the force applying member and thence to the usual manually operable steering wheel.

I do not limit my invention, in the broader aspects thereof, to any particular combination and arrangement of parts such as shown and described for illustrative purposes since various modifications will be apparent from the teachings of my invention and scope thereof as defined in the appended claims.

I claim:

1. In a steering apparatus including a pair of tie rods, actuating mechanism for said rods including a swingable pitman arm, a connecting member having spaced separately formed connection with said rods respectively and forming a rigid force transmitting connection between the latter, said member having an operating connection with said pitman arm through which steering forces are transmitted from the latter to said member, said last mentioned connection including a body of deformable non-metallic material having vibration dampening characteristics.

2. In a steering apparatus including a pair of tie rods, actuating mechanism for said rods including a swingable pitman arm, a member having a spaced separately formed operating connection with the said rods respectively and forming a rigid operating connection therebetween, said connections being inextensible in the direction of the steering forces transmitted by said rods, said member having an operating connection with said pitman arm, said last mentioned connection including a body of deformable non-metallic material adapted to accommodate limited relative movement between said member and said pitman arm.

3. In a steering apparatus including a pair of tie rods, actuating mechanism for said rods including a swingable pitman arm, said arm having a bolt-like end portion, a member having articulated inextensible connections with said tie rods respectively, said member having an opening therein receiving said bolt-like end portion of said pitman arm, and a body of deformable non-metallic material interposed between said bolt-like end portion and the wall bounding said opening.

4. In a steering apparatus including a pair of tie rods, actuating mechanism for said rods including a swingable pitman arm structure comprising a pair of plate-like members, one of said members including angularly disposed extensions having articulated connections with said tie rods and the other of said plate-like members having a connection with said mechanism, and a body of non-metallic deformable material disposed between said plate-like members.

5. In a steering apparatus including a pair of tie rods, actuating mechanism for said rods including a swingable pitman arm structure comprising a pair of plate-like members, one of said members including angularly disposed extensions having articulated connections with said tie rods and the other of said plate-like members having a connection with said mechanism, and a body of non-metallic deformable material disposed between said plate-like members, one of said members having an opening therein and the other of said members having a portion thereof extending into said opening in spaced relation to the walls thereof, said material extending into said opening intermediate the walls thereof and the portion of said other member extending therein.

6. In a steering apparatus, a pair of actuatable tie rods, mechanism for actuating said rods, and means forming an operating connection between said tie rods and said actuating mechanism, said means including a pair of members one having inextensible connections with said rods respectively and the other of said members having an inextensible connection with said mechanism, said members having portions thereof disposed in superimposed relationship, and a body of rubber disposed between said portions.

7. In a steering apparatus, a pair of tie rods, actuating mechanism for said rods, including a swingable pitman arm, a connecting member for said tie rods including angularly disposed arms having articulated connections with a respective tie rod and forming a rigid force transmitting connection between the latter, and means including a body of deformable non-metallic material forming steering force transmitting connection between said connecting member and said pitman arm, said material accommodating relative movement between said member and said pitman arm.

8. In a steering apparatus, a pair of tie rods, actuating mechanism for said rods, including a swingable pitman arm, a steering force transmitting member connecting said tie rods, said member including angularly disposed arms having articulated connections with a respective tie rod, each of said connections being inextensible in the direction of steering forces transmitted by said rods, and means operably connecting said member and said pitman arm, said connecting means including a body of deformable non-metallic material though which the steering actuating force is transmitted from said pitman arm to said member, said body being so constructed and arranged as to dampen vibration tending to be transmitted between said member and said pitman arm.

9. In a steering apparatus including a pair of tie rods having spaced end portions, actuating mechanism for said rods including a swingable pitman arm structure having an opening therein, a member extending between said end portions and having individual connections respectively therewith, said member forming a rigid steering force transmitting connection between said tie rods and extending through the opening in said pitman arm structure in spaced relation to the walls bounding said opening, and a bushing including a body of deformable non-metallic material disposed in said opening and forming an operating connection between said member and said pitman arm.

10. In a joint for vehicle steering apparatus, the combination of a pair of tie rods and a member having spaced separately formed connections with said rods respectively and adapted to transmit steering force thereto; a second member actuatable to transmit a steering force to said first mentioned member, one of said members having an opening therein and the other of said members having a portion thereof extending into said opening; and a body of rubber-like material disposed between said portion and the wall bounding said opening and forming an operating connection between said members.

11. In a joint for vehicle steering apparatus, the combination of a pair of tie rods and a member having spaced separately formed connection with the latter and forming a rigid force transmitting connection therebetween; a second member extending substantially transversely with respect to said first mentioned member and actuatable for transmitting a steering force to the latter, and a body of deformable non-metallic material forming an operating connection between said members and adapted to transmit steering force to said first mentioned member, said material being so arranged in said connection as to be stressed in shear in transmitting said steering force.

12. In a steering apparatus including a pair of tie rods, actuating mechanism for said rods including a swingable pitman arm, means operatively connecting said tie rods and said pitman arm including a member having spaced separately formed connections with the adjacent ends of said tie rods respectively, said connections being inextensible in the direction of steering forces transmitted by said rods, said member having spaced connections with said pitman arm, said last mentioned connections including a body of deformable non-metallic material adapted to accommodate limited relative movement between said member and said pitman arm.

13. In a steering mechanism including a pair of tie rods having spaced end portions, actuating mechanism for said rods including means having spaced individual connections with said tie rod end portions respectively and forming a rigid operating connection between said rods, said means including a pair of members having spaced substantially flat portions, and a body of rubber-like material interposed between said portions.

CHESTER C. UTZ.